(12) United States Patent
Paeng et al.

(10) Patent No.: US 9,159,504 B2
(45) Date of Patent: Oct. 13, 2015

(54) APPARATUS FOR STORING ELECTRIC ENERGY AND METHOD OF MANUFACTURING THE SAME

(71) Applicant: SAMSUNG ELECTRO-MECHANICS CO., LTD., Suwon-si, Gyeonggi-do (KR)

(72) Inventors: Se Woong Paeng, Suwon-si (KR); Eun Sil Kim, Suwon-si (KR); Bae Kyun Kim, Suwon-si (KR); Jae Hoon Choi, Yeongtong-gu (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 189 days.

(21) Appl. No.: 13/842,862

(22) Filed: Mar. 15, 2013

(65) Prior Publication Data

US 2014/0185191 A1 Jul. 3, 2014

(30) Foreign Application Priority Data

Dec. 27, 2012 (KR) ......................... 10-2012-0155029

(51) Int. Cl.
| | |
|---|---|
| *H01G 11/66* | (2013.01) |
| *H01G 11/70* | (2013.01) |
| *H01G 11/12* | (2013.01) |
| *H01G 11/72* | (2013.01) |
| *H01G 11/76* | (2013.01) |
| *H01G 11/82* | (2013.01) |
| H01G 11/28 | (2013.01) |
| H01G 11/26 | (2013.01) |
| H01G 11/24 | (2013.01) |
| H01G 11/22 | (2013.01) |

(52) U.S. Cl.
CPC ............... *H01G 11/70* (2013.01); *H01G 11/12* (2013.01); *H01G 11/72* (2013.01); *H01G 11/76* (2013.01); *H01G 11/82* (2013.01); *H01G 11/22* (2013.01); *H01G 11/24* (2013.01); *H01G 11/26* (2013.01); *H01G 11/28* (2013.01); *Y02E 60/13* (2013.01); *Y10T 29/417* (2015.01)

(58) Field of Classification Search
None
See application file for complete search history.

(56) References Cited

U.S. PATENT DOCUMENTS

| | | | | |
|---|---|---|---|---|
| 2008/0089006 | A1* | 4/2008 | Zhong et al. | 361/303 |
| 2008/0089009 | A1* | 4/2008 | Kashihara et al. | 361/500 |
| 2009/0021891 | A1* | 1/2009 | Higashi et al. | 361/502 |
| 2010/0226069 | A1* | 9/2010 | Norieda et al. | 361/502 |
| 2011/0317331 | A1* | 12/2011 | Lee et al. | 361/502 |

FOREIGN PATENT DOCUMENTS

| | | |
|---|---|---|
| KR | 2011-0047609 A | 5/2011 |
| KR | 2011-0087844 A | 8/2011 |

* cited by examiner

*Primary Examiner* — Dion R Ferguson
(74) *Attorney, Agent, or Firm* — McDermott Will & Emery LLP

(57) ABSTRACT

Disclosed herein is an apparatus for storing an electric energy, the apparatus including: an electrode stack in which a cathode and an anode in which a cathode lead and an anode lead are respectively formed are alternately stacked; and collector plates disposed at both sides of the electrode stack, connected to the cathode lead and the anode lead, and provided with external terminals and one or more electrolyte flow holes.

6 Claims, 7 Drawing Sheets

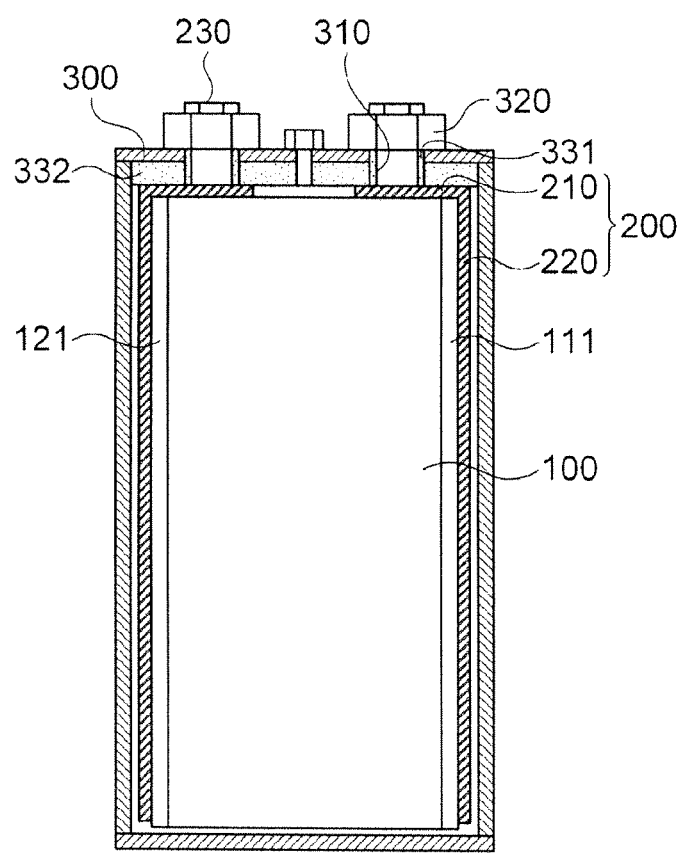
[FIG. 1]

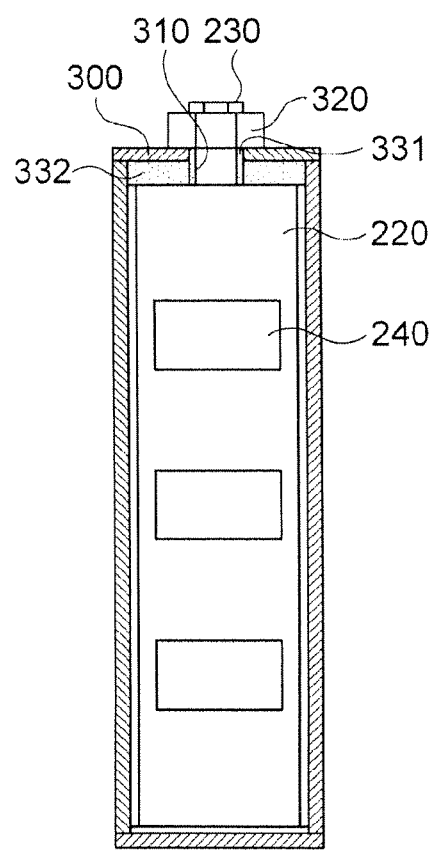
[FIG. 2]

[FIG. 3]
100
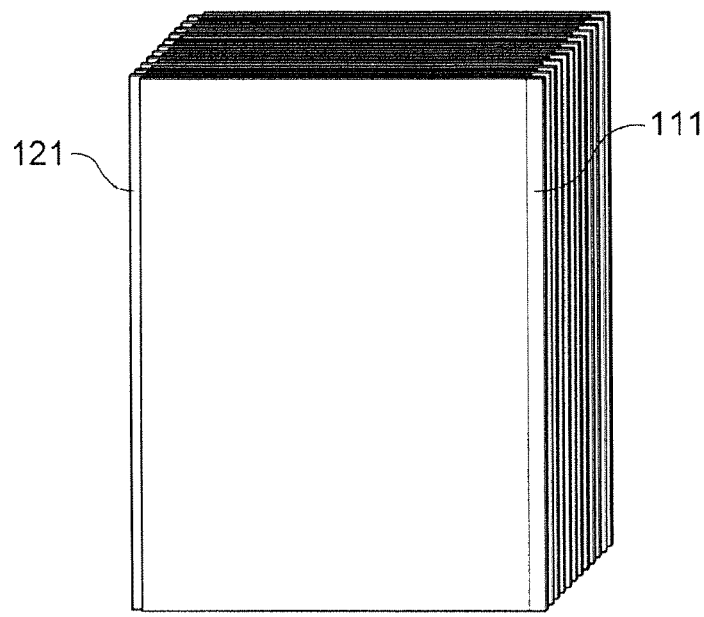
[FIG. 4A]
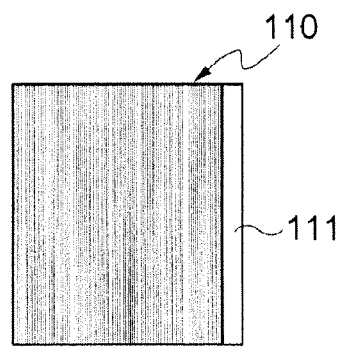

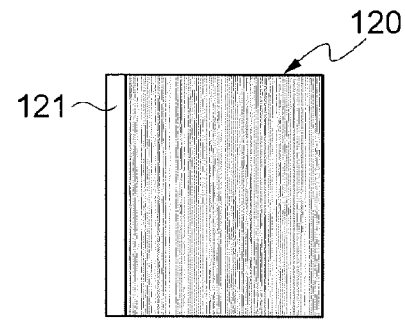
[FIG. 4B]
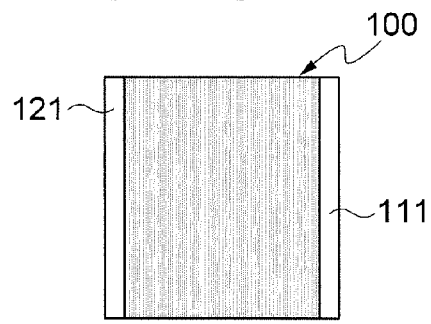
[FIG. 4C]
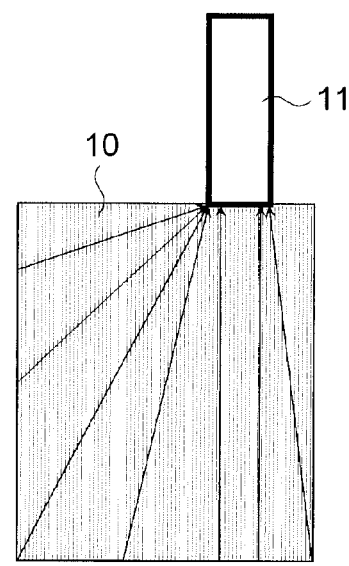
[FIG. 5A]
-Prior Art-

[FIG. 6]
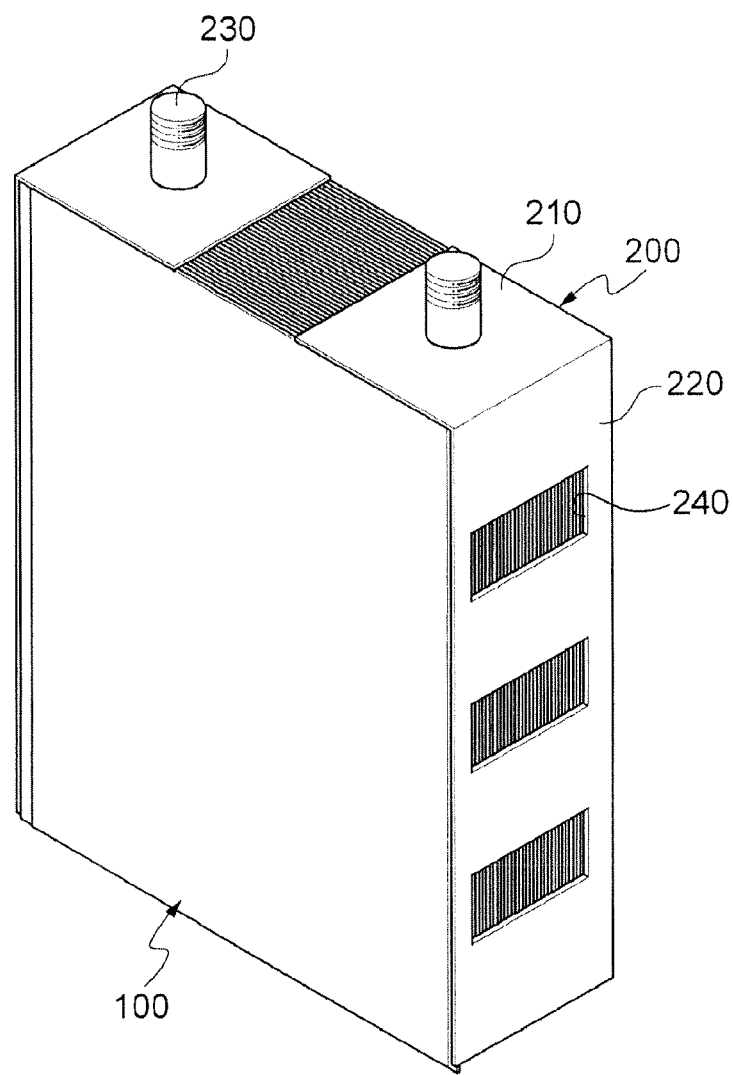

APPARATUS FOR STORING ELECTRIC ENERGY AND METHOD OF MANUFACTURING THE SAME

CROSS REFERENCE(S) TO RELATED APPLICATIONS

This application claims the benefit under 35 U.S.C. Section 119 of Korean Patent Application Serial No. 10-2012-0155029, entitled "Apparatus for Storing Electric Energy and Method of Manufacturing the Same" filed on Dec. 27, 2012, which is hereby incorporated by reference in its entirety into this application.

BACKGROUND OF THE INVENTION

1. Technical Field

The present invention relates to an apparatus for storing an electric energy and a method of manufacturing the same, and more particularly, to an apparatus for storing an electric energy having an angular structure of an improved resistance characteristic and a method of manufacturing the same.

2. Description of the Related Art

In general, apparatuses for storing an electric energy include batteries and capacitors.

Capacitors are generally classified into electrostatic capacitors, electrolytic capacitors, and electrochemical capacitors. Electrochemical capacitors are referred to as super capacitors and are electric energy storing apparatuses that store and supply the electric energy by using a movement of ions caused by an electrochemical reaction between electrodes and electrolytes, which have recently received much attention as new concept electric energy storage power sources cable of quickly storing or supplying a great amount of energy owing to their excellence in an energy density and an output density compared to conventional electrolytic capacitors and secondary batteries.

Such super capacitors have a very high capacitance, can be quickly charged and discharged, and have a high charging and discharging efficiency and a semipermanent cycle lifespan, by using a charging phenomenon due to a simple movement of ions to an interface between electrodes and electrolytes or a surface chemical reaction.

Since the above super capacitors have a characteristic of supplying a great amount of current within a short time, a market tends to increase to systems requiring an independent power supply apparatus, systems for adjusting an overload that instantly occurs, and energy storing apparatuses. In particular, since the super capacitors have excellent energy input and output compared to secondary batteries, the super capacitors are expected to have a variety of applications as a back-up power source that is an auxiliary power operating at an instant blackout, a pulse power source of a portable mobile communication device, and a high output power source of a hybrid electric car. Also, the super capacitors have excellent charging and discharging efficiency or lifespan compared to secondary batteries, relatively wide available temperatures and voltage ranges, need no maintenance and repair, and are advantageously environment-friendly, and thus being reviewed as secondary battery substitutes.

The above super capacitors are manufactured as two types of cylindrical and angular shapes. The angular super capacitors are mainly used since they have higher space efficiency than the cylindrical super capacitors when a module is manufactured.

In the conventional angular super capacitors, an electrode stack is manufactured by stacking electrodes on which an active material is coated and electrodes. A single super capacitor is manufactured by using a single of the above-manufactured electrode stack or by combining a plurality of the above-manufactured electrode stacks according to a designed capacity. The single super capacitor is manufactured by binding leads of electrodes, performing ultrasonic welding or cold welding on the leads, performing a rivet on an external terminal unit formed in a case, and forming an external terminal.

In the above-manufactured super capacitors, as shown in FIG. 5A, when current is applied, charges in the electrodes may move to the leads connected to the terminals, and a resistance component may occur due to the leads of limited sizes. Also, since the leads of electrodes are bound to connect the leads to the external terminal using the rivet, a contact resistance occurs, and heat is generated at a part connected to the external terminal when a high current is charged and discharged, which causes a problem of promoting deterioration of super capacitors.

SUMMARY OF THE INVENTION

An object of the present invention is to provide an apparatus for storing an electric energy capable of improving a resistance characteristic of an electrode itself and a method of manufacturing the same.

Another object of the present invention is to provide an apparatus for storing an electric energy capable of improving a resistance characteristic of a contact part of an electrode and a case terminal and a method of manufacturing the same.

Another object of the present invention is to provide an apparatus for storing an electric energy capable of readily impregnating an electrode and an electrolyte and a method of manufacturing the same.

According to an exemplary embodiment of the present invention, there is provided an apparatus for storing an electric energy, the apparatus including: an electrode stack in which a cathode and an anode in which a cathode lead and an anode lead are respectively formed are alternately stacked; and collector plates disposed at both sides of the electrode stack, connected to the cathode lead and the anode lead, and provided with external terminals and one or more electrolyte flow holes.

The cathode lead may be formed in one side portion of the cathode in a length direction.

The anode lead may be formed in one side portion of the anode in a length direction.

The collector plates may be bonded to the electrode stack through laser welding.

The collector plates may be integrally formed with the external terminals.

The electrode stack may further include: a separator interposed between the cathode and the anode.

The apparatus may further include: a case for accommodating the electrode stack and the collector plates and provided with through-holes for passing through the external terminals, wherein first insulation members are inserted into the through-holes.

The apparatus may further include: second insulation members interposed between the case and the collector plates.

According to another exemplary embodiment of the present invention, there is provided a method of manufacturing an apparatus for storing an electric energy, the method including: forming an electrode stack by sequentially stacking a cathode in which a cathode lead is formed, a separator, and an anode in which an anode lead is formed; bonding collector plates to both sides of the electrode stack; and accommodating the electrode stack bonded to the collector plates in a case and injecting an electrolyte.

The cathode lead may be formed in one side portion of the cathode in a length direction, and the cathode lead may be formed in one side portion of the cathode in a length direction.

One or more electrolyte flow holes may be formed in the collector plates.

External terminals may be integrally formed with upper portions of the collector plates.

In the bonding of the collector plates to both sides of the electrode stack, the collector plates are bonded to the both sides of the electrode stack through laser welding.

BRIEF DESCRIPTION OF THE DRAWINGS

FIG. 1 is a front cross-sectional view of an apparatus for storing an electric energy according to an exemplary embodiment of the present invention;

FIG. 2 is a lateral cross-sectional view of an apparatus for storing an electric energy according to an exemplary embodiment of the present invention;

FIG. 3 is a perspective view of an electrode stack of FIG. 1;

FIGS. 4A, 4B, and 4C are front views of an electrode stack of FIG. 1;

FIGS. 5A and 5B are schematic views for comparing a conventional electrode and an electrode of an apparatus for storing an electric energy according to an exemplary embodiment of the present invention;

FIG. 6 is a perspective view of a combination of an electrode stack and a collector plate of FIG. 1.

DESCRIPTION OF THE PREFERRED EMBODIMENTS

Hereinafter, exemplary embodiments of the present invention will be described in detail with reference to the accompanying drawings. However, this is only by way of example and therefore, the present invention is not limited thereto.

When technical configurations known in the related art are considered to make the contents obscure in the present invention, the detailed description thereof will be omitted. Further, the following terminologies are defined in consideration of the functions in the present invention and may be construed in different ways by the intention of users and operators. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

An embodiment of an apparatus for storing an electric energy according to an exemplary embodiment of the present invention will now be described in more detail with reference to FIGS. 1 through 6.

Figure 5B:
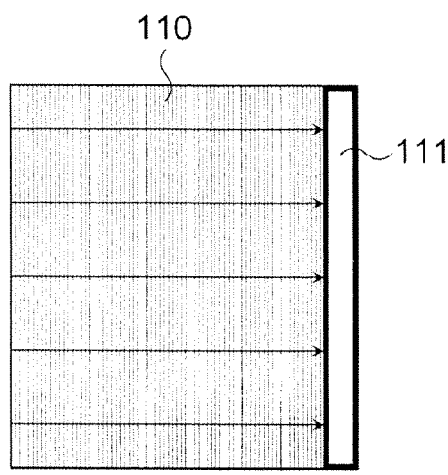

FIG. 1 is a front cross-sectional view of an apparatus for storing an electric energy according to an exemplary embodiment of the present invention. FIG. 2 is a lateral cross-sectional view of an apparatus for storing an electric energy according to an exemplary embodiment of the present invention. FIG. 3 is a perspective view of an electrode stack of FIG. 1. FIGS. 4A, 4B, and 4C are front views of an electrode stack of FIG. 1. FIGS. 5A and 5B are schematic views for comparing a conventional electrode and an electrode of an apparatus for storing an electric energy according to an exemplary embodiment of the present invention. FIG. 6 is a perspective view of a combination of an electrode stack and a collector plate of FIG. 1.

Referring to FIGS. 1 through 6, the apparatus for storing the electric energy according to an exemplary embodiment of the present invention may include an electrode stack 100 in which a cathode 110 and an anode 120 at which a cathode lead 111 and an anode lead 121 are respectively formed are alternately stacked, and collector plates 200 disposed at both sides of the electrode stack 100, connected to the cathode lead 111 and the anode lead 121, and provided with external terminals 230.

The electrode stack 100 in which electrodes classified into the cathode 110 and the anode 120 are stacked may include at least one cathode 110 and anode 120 that are alternately stacked and a separator (not shown) interposed between the cathode 110 and the anode 120.

The cathode 110 may be formed by coating a plate shaped collector formed of a metal material such as aluminum with an active material such as active carbon or transition metal oxide. In this regard, the cathode 110 may have a portion at which the active material is not coated. The portion at which the active material is not coated is formed as the cathode lead 111. In this regard, the cathode lead 111 may function as a path for a current flow with the outside of the cathode 110.

Also, the anode 120 may be formed by coating a plate shaped collector formed of a metal material such as aluminum, copper, or nickel with an active material such as active carbon or graphite. In this regard, the anode 120 may have a portion at which the active material is not coated. The portion at which the active material is not coated is formed as the anode lead 121. In this regard, the anode lead 121 may function as a path for a current flow with the outside of the anode 120.

However, the materials of the cathode 110 and the anode 120 of the present embodiment are not limited thereto.

Meanwhile, the cathode lead 111 and the anode lead 121 respectively formed in the cathode 110 and the anode 120 may be formed at one side portion of the cathode 110 and the anode 120 in length directions.

In this regard, as shown in FIG. 5A, a lead 11 is formed at an upper one side of a conventional electrode 10, and thus a charge flow is focused on the upper one side if current is applied to the electrode 10, and a resistance component occurs due to the lead 11 of a limited size.

However, as shown in FIG. 5B, the cathode lead 111 and the anode lead 121 are respectively formed at one side portion of the cathode 110 and the anode 120 in a length direction, and thus the charge flow may be smooth, thereby reducing the resistance component.

The collector plates 200 may be electrically connected to the cathode lead 111 and the anode lead 121 that are formed at both sides of the electrode stack 100.

In this regard, the collector plates 200 may be formed in a shape "⊐" and of a metal or an equivalent thereof. For example, the collector plates 200 may be formed of any one selected from the group consisting of aluminum, copper, and stainless steel. However, the materials of the collector plates 200 are not limited thereto.

Also, the collector plates 200 may be formed as a horizontal collector plate 210 and a vertical collector plate 220. The horizontal collector plate 210 may be formed to contact an upper surface of the electrode stack 100. The vertical collector plate 220 may be formed to contact the cathode lead 111 and the anode lead 121 formed at both sides of the electrode stack 100.

In this regard, the vertical collector plate 220 of the collector plates 200 may be bonded and electrically connected to the cathode lead 111 and the anode lead 121 of side surfaces of the electrode stack 100 through welding. For example, the vertical collector plate 220 of the collector plates 200 may be preferably bonded to the cathode lead 111 and the anode lead 121 of the electrode stack 100 through laser welding.

That is, the collector plates 200 are bonded to both sides of the electrode stack 100 through laser welding, and thus a damage due to an external shock may be prevented, are bonded to the entire surfaces of the cathode lead 111 and the anode lead 121 formed in the length direction of the electrode stack 100, and thus a wide contact area may be obtained, thereby reducing resistance.

In addition, the external terminals 230 passing through a case 300 that will be described later may be formed an upper portion of the horizontal collector plate 210 of the collector plates 200.

In this regard, the external terminals 230 may be integrally formed with the collector plates 200 by using an extrusion molding method.

That is, although resistance occurs in a coupling portion since a separate coupling member such as a rivet is conventionally used to couple external terminals of a case, the external terminals 230 are integrally formed with the collector plates 200 in an embodiment of the present invention, which may reduce an occurrence of resistance and may be coupled to the case 300 without the separate coupling member such as the rivet, thereby reducing a manufacturing time, and, a space occupied by the coupling member may be efficiently used, thereby increasing capacity of the apparatus for storing the electric energy.

Meanwhile, one or more electrolyte flow holes 240 may be formed in the vertical collector plate 220 of the collector plates 200.

That is, the electrolyte flow holes 240 are accommodated in the case 300 that will be described later along with the electrode stack 100. If an electrolyte is injected into the electrolyte flow holes 240, the electrolyte flow to the outside of the electrode stack 100 of inner sides of the collector plates 200 and the collector plates 200 through the electrolyte flow holes 240, and thus the electrolyte may be smoothly impregnated into the cathode 110 and the anode 120 of the electrode stack 100.

As described above, the electrode stack 100 bonded to the collector plates 200 may be accommodated in the case 300 having a space inside thereof.

In this regard, the case 300 may be formed of a conductive metal such as aluminum, an aluminum alloy, or nickel plated steel and in an approximately hexahedral shape.

In this regard, through-holes 310 may be formed in an upper portion of the case 300 in such a manner that the external terminals 230 formed in the collector plates 200 may pass through and protrude. Nuts 320 may be coupled and fixed to the external terminals 230 that pass through the through-holes 310.

Meanwhile, first insulation members 331 may be inserted into inner sides of the through-holes 310 of case 300 so as to insulate the external terminal 230 and the case 300 each other.

Also, second insulation members 332 are disposed between an upper inner side of the case 300 and the collector plates 200 accommodated in the case 300 so as to insulate the case 300 and the collector plates 200.

A method of manufacturing an apparatus for storing an electric energy of the present invention will now be described below.

Figure 7:
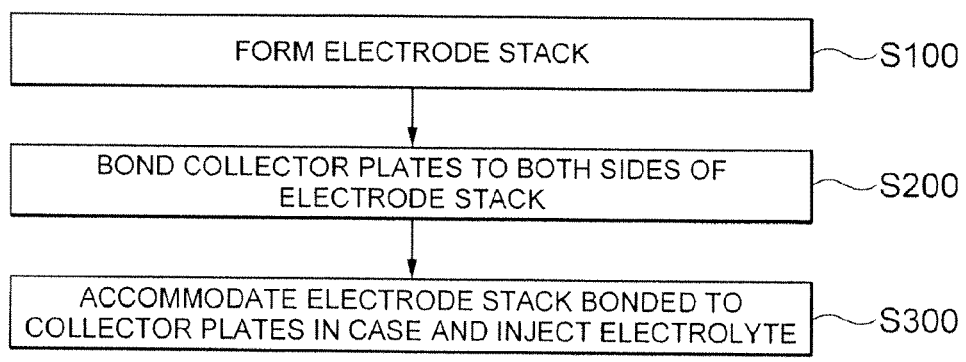
FIG. 7 is a flowchart of a method of manufacturing an apparatus for storing an electric energy according to an exemplary embodiment of the present invention.

FIG. 7 is a flowchart of a method of manufacturing an apparatus for storing an electric energy according to an exemplary embodiment of the present invention.

Referring to FIG. 7, the method of manufacturing the apparatus for storing the electric energy according to an embodiment of the present invention may perform an operation (S100) of forming the electrode stack 100 by sequentially stacking the cathode 110 in which the cathode lead 111 is formed, a separator (not shown), and the anode 120 in which the anode lead 121 is formed.

In this regard, the cathode lead 111 may be formed in one side surface of the cathode 110 in a length direction, and the anode lead 121 may be formed in one side surface of the anode 120 in a length direction.

Also, the cathode 110 and the anode 120 may be alternately stacked in the electrode stack 100. In this regard, the separator may be preferably interposed between the cathode 110 and the anode 120.

Next, an operation (S200) of bonding the collector plates 200 to both sides of the electrode stack 100 may be performed.

In this regard, the collector plates 200 may consist of the horizontal collector plate 210 and the vertical collector plate 220 and may be formed in a shape "⌐". The external terminals 230 may be integrally formed with the horizontal collector plate 210. The electrolyte flow holes 240 may be formed in the vertical collector plate 220.

Meanwhile, the horizontal collector plate 210 of the collector plates 200 may contact an upper surface of the electrode stack 100. The vertical collector plate 220 of the collector plates 200 may be disposed to contact the cathode lead 111 and the anode lead 121 formed at both sides of the electrode stack 100 and bonded to the electrode stack 100 by laser welding.

Thereafter, an operation (S300) of accommodating the electrode stack 100 bonded to the collector plates 200 in the case 300 and injecting an electrolyte may be performed.

In this regard, the apparatus for storing the electric energy may be obtained by passing the external terminals 230 of the collector plates 200 through the through-holes 310 formed in an upper portion of the case 300 and coupling the nuts 320 to the external terminal 230.

In this regard, the external terminal 230 and the case 300 may be insulated from each other by inserting the first insulation members 331 into the through-holes 310, and the collector plates 200 and the case 300 may be insulated from each other by placing the second insulation members 332 between an inner upper portion of the case 300 and the collector plates 200.

As described above, an apparatus for storing an electric energy and a method of manufacturing the same according to an embodiment of the present invention may advantageously improve a resistance characteristic of an inside of an electrode since a lead is formed in one side surface of the electrode in a length direction and thus a flow of charges is not focused.

Further, a collector plate integrally formed with an external terminal is formed and contacts the lead of the electrode, which reduces a resistance with respect to a contact part, and thus durability may be prevented from being degraded due to deterioration. A rivet member for connecting the lead formed on the electrode and the external terminal is not necessary, and thus an inner space may be efficiently used, thereby advantageously increasing a capacity.

In addition, an electrolyte may flow through an electrolyte flow hole formed in the collector plate, and thus the electrode and the electrolyte may be advantageously impregnated readily.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims. Accordingly, such modifications, additions and substitutions should also be understood to fall within the scope of the present invention.

What is claimed is:

1. An apparatus for storing an electric energy, the apparatus comprising:
    an electrode stack in which a cathode and an anode in which a cathode lead and an anode lead are respectively formed are alternately stacked; and
    collector plates disposed at both sides of the electrode stack, connected to the cathode lead and the anode lead, and provided with external terminals and one or more electrolyte flow holes,
    wherein the cathode lead is formed along the entire length of one side of the cathode and the anode lead is formed along the entire length of one side of the anode.

2. The apparatus according to claim 1, wherein the collector plates are bonded to the electrode stack through laser welding.

3. The apparatus according to claim 1, wherein the collector plates are integrally formed with the external terminals.

4. The apparatus according to claim 1, wherein the electrode stack further includes a separator interposed between the cathode and the anode.

5. The apparatus according to claim 1, further comprising a case accommodating the electrode stack and the collector plates and provided with through-holes for passing through the external terminals,
    wherein first insulation members are inserted into the through-holes.

6. The apparatus according to claim 5, further comprising second insulation members interposed between the case and the collector plates.

* * * * *